(12) United States Patent
Rexhaüser et al.

(10) Patent No.: US 7,878,772 B2
(45) Date of Patent: Feb. 1, 2011

(54) COMPRESSOR ASSEMBLY HAVING AN AIR-COOLED ELECTRIC MOTOR

(75) Inventors: Stefan Rexhaüser, Hinternah (DE); Andreas Foerster, Dörfles-Esbach (DE)

(73) Assignee: Kaeser Kompressoren GmbH, Coburg (DE)

( * ) Notice: Subject to any disclaimer, the term of this patent is extended or adjusted under 35 U.S.C. 154(b) by 1047 days.

(21) Appl. No.: 11/374,179

(22) Filed: Mar. 14, 2006

(65) Prior Publication Data

US 2006/0204371 A1    Sep. 14, 2006

(30) Foreign Application Priority Data

Mar. 14, 2005 (EP) ................... 05005475

(51) Int. Cl.
*F04B 39/02* (2006.01)
(52) U.S. Cl. .................. 417/368; 417/372; 417/313
(58) Field of Classification Search ................ 417/368, 417/313, 243, 372, 366
See application file for complete search history.

(56) References Cited

U.S. PATENT DOCUMENTS

| | | | |
|---|---|---|---|
| 2,073,833 A | | 3/1937 | Bothezat |
| 3,078,737 A | * | 2/1963 | McGavern .................. 310/51 |
| 3,385,516 A | * | 5/1968 | Omohundro .............. 416/93 R |
| 4,836,755 A | * | 6/1989 | Nitsche et al. .............. 417/368 |
| 5,507,618 A | * | 4/1996 | Kubo et al. .............. 415/182.1 |
| 5,618,164 A | * | 4/1997 | Holzheimer et al. .......... 417/68 |
| 5,814,908 A | * | 9/1998 | Muszynski .................. 417/366 |
| 5,903,060 A | | 5/1999 | Norton |
| 6,210,132 B1 | * | 4/2001 | Shiinoki et al. ............. 417/368 |
| 6,514,052 B2 | * | 2/2003 | Bostwick .................... 417/366 |
| 7,063,515 B2 | * | 6/2006 | Graber et al. ............... 417/368 |

FOREIGN PATENT DOCUMENTS

| | | |
|---|---|---|
| CN | 2322093 | 6/1999 |
| DE | 616524 C | 7/1935 |
| DE | 850317 C | 9/1952 |
| DE | 3624386 A1 | 1/1998 |
| EP | 1 367 697 A1 | 12/2003 |
| GB | 634186 A | 3/1950 |
| JP | 11-013674 | 1/1999 |
| JP | 2000027777 A | 1/2000 |

* cited by examiner

*Primary Examiner*—Devon C Kramer
*Assistant Examiner*—Peter J Bertheaud
(74) *Attorney, Agent, or Firm*—Jean C. Edwards, Esq.; Akerman Senterfitt LLP

(57) ABSTRACT

An air-cooled electric motor is provided, which may be used in a compressor assembly, including a motor unit with a motor housing out of which a drive shaft extends, such that the drive shaft drives a ventilator, the ventilator includes at least two radially and/or axially separated ventilator sections to propel a first airstream as well as at least one other, second airstream that is separate from the first airstream, such that the airstreams are conducted separately on both the inflow side of the ventilator and the outflow side of the ventilator.

28 Claims, 4 Drawing Sheets

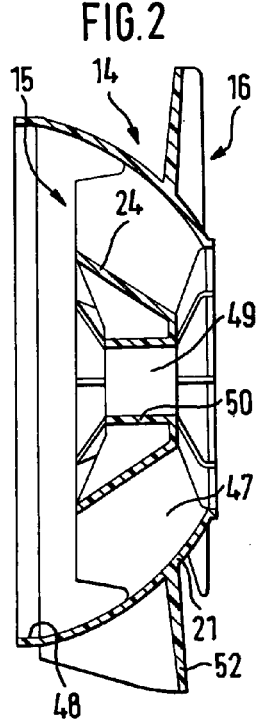
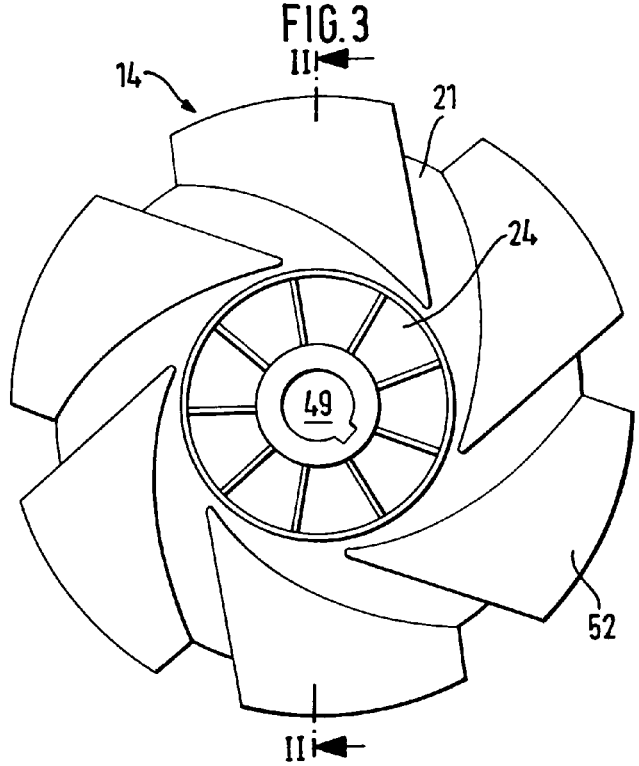
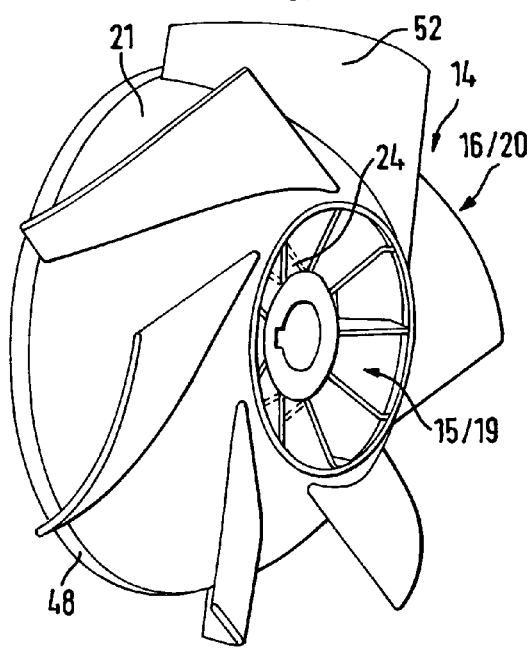
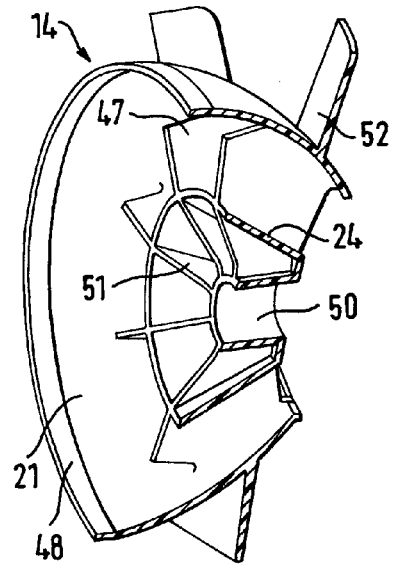

COMPRESSOR ASSEMBLY HAVING AN AIR-COOLED ELECTRIC MOTOR

PRIORITY CLAIM

This application claims priority to European patent application 05005475.8, filed Mar. 14, 2005, the entire contents of which are incorporated herein by reference.

FIELD OF THE INVENTION

The invention relates to a compressor assembly including an air-cooled electric motor as well as to an air-cooled electric motor, in particular for use in a compressor assembly, including a motor unit with a motor housing from which a drive shaft projects, such that a ventilator is driven by the drive shaft.

BACKGROUND OF THE INVENTION

Electric motors, for instance, asynchronous motors running on three-phase current, are frequently designed so as to be "self-ventilating". For this purpose, a ventilator is attached to the drive shaft and supplies the motor with cooling air. This ventilator usually includes a radial fan, but in rare cases, an axial fan is provided that is mounted on one end of the drive shaft, the so-called B-side of the electric motor, and rotates below a fixed ventilator cowl that is attached to the motor housing. The cowl guides the stream of cooling air into the axial cooling ribs of the motor housing so as to achieve an optimal cooling effect. Thus, the motor housing is cooled from its outside.

For many applications, electric motors must drive both a number of machines and also accessory ventilators for the assembly. The accessory ventilators supply cooling air to, for example, the machine sets that are being driven by the motor.

SUMMARY OF THE INVENTION

The invention provides a structural arrangement in which, in order to cool both the electric motor itself and also other sets of machines that may be present, two airstreams are generated in a particularly simple and reliable way.

This is achieved by a compressor assembly that includes an air-cooled electric motor. The compressor assembly provides a compressed gas fluid and includes a heat exchanger for direct or indirect cooling of the gas fluid; an air-cooled electric motor that includes a motor unit with a motor housing out of which a drive shaft projects, the drive shaft being used to drive a ventilator. The ventilator includes at least radially and/or axially separated ventilator sections to propel a first airstream as well as at least one other airstream that is separate from the first airstream. The airstreams enter the respectively associated ventilator sections by way of spatially separated cross sections and emerge from the sections without becoming mixed or without substantial mixing and such that at least one of the airstreams, preferably the second airstream, and in some cases additional airstreams is/are guided through the heat exchanger.

According to another embodiment, an air-cooled electric motor is provided, in particular for use in a compressor assembly. The motor unit includes a motor housing out of which a drive shaft extends, such that the drive shaft drives a ventilator, wherein the ventilator includes at least two radially and/or axially separated ventilator sections to propel a first airstream as well as at least one other, second airstream separate from the first airstream. The airstreams enter the respectively associated ventilator sections by way of spatially separated cross sections and also emerge from the sections again without becoming mixed, or without substantial mixing, and such that the airstreams are conducted separately at least on the inflow side of the ventilator.

One aspect of the invention resides in the fact that the ventilator provided in accordance with the invention and disposed on the drive shaft includes at least two radially and/or axially separated ventilator sections to propel a first airstream as well as at least one other, second airstream. The second airstream is separate from the first airstream, such that the airstreams enter the associated ventilator compartments by way of spatially separate cross sections and emerge from these compartments without becoming mixed with one another, or without substantial mixing.

According to another embodiment, a compressor assembly is provided that includes an air-cooled electric motor, a compressor that is driven by the motor unit of the electric motor and makes available a compressed gas fluid, and a heat exchanger for direct or indirect cooling of the gas fluid, such that at least one of the airstreams, preferably the second airstream and where appropriate also other airstreams, is/are conducted over the heat exchanger.

Another aspect of the invention resides in the fact that the ventilator provided in accordance with the invention and disposed on the drive shaft includes at least two radially and/or axially separated ventilator sections to propel a first airstream as well as at least one other, second airstream. The second airstream is separate from the first airstream, such that the airstreams are conducted separately at least on the inflow side of the ventilator, preferably also on the outflow side of the ventilator. As a result, at least on the inflow side and preferably also on the outflow side of the ventilator, there are separate in- and outflow cross sections for the at least two separate airstreams. The separation of the inflow cross sections from one another, and/or of the outflow cross sections, may be accomplished by a radial separation.

The term "conducted separately" used throughout the specification implies an arrangement that keeps the two airstreams at least substantially separate from one another, at least in parts of the airstreams situated immediately ahead of the entrance into the ventilator and/or immediately after the exit from the ventilator. The flow path for separate conduction ahead of and/or after the ventilator may correspond at least to the dimensions of the ventilator in the axial direction, and may amount to a multiple of this size. This construction in accordance with the invention enables an electric motor with a single ventilator to generate two airstreams, in particular for the purpose of cooling, which are conducted separately on both inflow and outflow sides. This makes it possible on the inflow side, for example, to take in airstreams that differ from one another regarding their temperature, freedom from contaminants, moisture content, etc., and/or to conduct these inflowing airstreams to sets of machines that differ in their cooling requirements. Such a subdivision is simultaneously also provided on the outflow side so that here, again, different cooling requirements can be fulfilled.

At the same time, integration to form a single ventilator produces an extremely compact construction as well as reducing the number of moving parts. In this case, the motor unit may be disposed downstream of the ventilator.

In an advantageous further development, the arrangement is such that the airstreams that have left the ventilator on the outflow side are conducted substantially in parallel.

In another embodiment, the airstreams on the outflow side of the ventilator are conducted parallel to the drive shaft.

In another embodiment, the first airstream is conducted in such a way that it passes along the outside of the motor housing and hence, in some cases by way of appropriate cooling ribs, cools the motor unit from outside.

The cooling of the electric motor is made more effective by providing a colder first airstream to the ventilator. The situation is optimal when the first airstream is delivered to the ventilator at the lowest ambient temperature, for example, with no previous warming. Specifically, this means that the airstream intended for cooling the electric motor is conducted in such a way that at least it is not used to cool any components of the assembly that are located upstream of the electric motor.

According to another embodiment, the inner section of the ventilator is constructed as a radial fan.

According to another embodiment, the outer section of the ventilator is constructed as an axial fan.

According to another embodiment, the ventilator includes a separating surface that may be rotationally symmetric, in particular is constructed as a rotating surface, and serves to separate the airstreams. Thus, the airstreams are kept separate from one another even while inside the ventilator. The intention being to separate them as thoroughly as possible; however, conduction of the two airstreams so that they remain separate within the ventilator to a considerable extent is also regarded as adequate in the sense of the invention.

In order to maintain the airstreams as separate as possible from one another on the inflow side of the ventilator, there can be provided at the electric motor, or inside a compressor assembly that incorporates the electric motor, a channel separator at the inflow side, e.g. in the form of a cylindrical tubular piece through the interior of which the first airstream is passed by suction. In this case, the suction draws the second airstream in by way of regions outside the piece of tubing (or a distinct guiding structure).

On the outflow side, the channels may be separated for instance, in the form, or substantially in the form, of a cylinder jacket that may enclose the motor housing at least in part and may be stationary, i.e. does not rotate with or in alternation with the ventilator.

In another embodiment, the separating surface within the ventilator is dimensioned according to the corresponding radii of the channel separators on the inflow side and/or on the outflow side, so that the airstreams are conducted with a sufficient separation from one another. The configuration of the channel separators on the inflow and/or outflow sides enables the separately conducted airstreams to be sufficiently sealed off from one another as they flow through geometrically and structurally simple channels, e.g. owing to the use of circular tube cross-sections with or without axial overlap and/or customary non-contact sealing means (gap, labyrinth etc.) or in some cases also contact-type gaskets (foam rubber blanks or the like).

In another embodiment, the ventilator can interact at its outer circumference with a rotationally symmetric, in particular, immobile tube that reduces the formation of eddies. Particularly, if the outer ventilator section is constructed as an axial fan, eddies can form at the tips of the fan blades, and these are reduced by employing such a tube. As a result, the efficiency is improved and the noise emission diminished. The tube can be fixedly mounted at the periphery of the ventilator and can rotate therewith. Alternatively, the tube can be fixedly mounted in the assembly, so that the ventilator rotates inside it, or a combination of these two solutions can be implemented.

The invention enables the ventilator to be attached on the side of the motor housing on which a gear train or a machine tool is simultaneously attached to the drive shaft (A-side of the motor), in which case the shaft end could be extended through the ventilator. According to another embodiment, the ventilator may be disposed on an opposite side of the motor housing (B-side of the motor), so that there is no obstacle to positioning a gear-train unit or to connecting a machine tool, etc. on the other side (A-side), if needed.

In another embodiment, the inner ventilator section includes a conical surface or a cone, in which case the first airstream is guided between the conical surface and the separating surface. Here, the conical surface or cone serves as the inner cover disk for the radial fan and should guide the first airstream in a manner as loss-free and as favorable to flow as possible, including along an end face of the motor unit.

The separating surface for separating the first airstream from the second airstream within the ventilator, in contrast, may be designed so that it at least partially also serves as a "ventilator cowl of the motor", such that the effective airstream within it is generated by the inner ventilator section, which is constructed as a radial fan. The separating surface serving as "ventilator cowl" can simultaneously be shaped so that the airstream conducted from the inner ventilator section on the outflow side is diverted into a direction substantially parallel to the drive shaft.

The channel separator on the outflow side, or the channel-separating element on the outflow side, may rotate along with the ventilator as an extension of the separating surface. However, it may be fixed in position, with a slight gap or adequate sealing means, and has a length amounting preferably to at least 40% of the length of the motor unit. The channel separator on the outflow side, or the channel-separating element on the outflow side, may be designed so that it at least substantially prevents mixing of the airstream conducted through the inner ventilator section with the airstream conducted through the outer ventilator section.

According to another embodiment, the ventilator may be attached to the drive shaft of the electric motor by way of an intervening torsional vibration damper. This attachment may be made, for example, by form- or force-fitting. In a concrete embodiment, a rubber sleeve can be provided, by way of which the ventilator is attached to the drive shaft. This is useful because the ventilator is often exposed to torque pulses, in particular when the compressor assembly is starting up from a stationary state. In the case of star-delta startup, this in particular coincides with the switching from star to delta. In a least favorable case, such torque pulses may cause permanent fractures in the ventilator. A torsional vibration damper can attenuate such torque pulses.

According to another aspect of the invention, the ventilator is constructed as a plastic injection-moulded part or as an aluminum diecast part or as an aluminum part formed by chill casting. If the ventilator is appropriately free of undercut regions, the mould for the injection or diecasting or chill-casting process may be constructed without a slider, i.e. including only the two halves of the mould. However, one of ordinary skill in the art will appreciate that it is possible to make the ventilator of other suitable materials.

According to another embodiment, a ventilator with at least two separate ventilator sections for conducting a first airstream plus at least one other airstream may be provided independently, i.e. without an associated electric motor.

Throughout the specification, the phrase "indirect cooling of the gas fluid" should be understood as including the cooling of the oil in an oil-injection compressor. There are indeed oil-injection screw-type compressors with output so low that they can operate without a supplementary cooler for the compressed air they produce, and have only a cooler for the circulating oil. In general, the oil cooler used for oil-injection screw-type compressors dissipates a greater amount of heat than does the supplementary compressed-air cooler, if the latter is present, for which reason the oil cooler is generally of larger dimensions.

According to another embodiment, the motor unit, ventilator and heat exchanger may be arranged with respect to one another in such a way that the heat exchanger is disposed upstream of the ventilator, with respect to the associated airstream. In addition, the ventilator is likewise disposed upstream of the motor unit with respect to the associated airstream.

According to one embodiment, the compressor assembly may be of relatively compact construction, i.e. its extent in the direction of the motor unit's drive shaft can be made relatively short. The A-side of the motor unit remains available for driving various components of the assembly. In the case of a belt drive, both the belt and the belt pulley can be easily exchanged. Furthermore, the motor unit can be cooled with fresh air, i.e. not with ambient air that has already been warmed up by other components of the assembly. The heat exchanger, in one embodiment, is cooled by a separate airstream that does not include previously heated ambient air.

In another embodiment, the heat exchanger may be integrated into an outer assembly housing in such a way that the heat exchanger may remain visible from outside the housing on the side where the associated airstream flows in. As a result, on one hand, the coldest possible ambient air is supplied to the heat exchanger and on the other hand, any contamination of the heat exchanger may be rapidly detected from outside, so that appropriate measures may be undertaken.

In another preferred embodiment, channels are provided in the compressor assembly and may include at least one inlet channel, a second or at least one additional inlet channel as well as an outlet channel, to conduct the gas fluid into and out of the compressor assembly enclosed in a sound-insulating assembly housing. In this case, the channels may be equipped with sound-attenuating structure, in particular sound-absorbing coatings on the walls, in order to damp sound emission from the compressor assembly. Here, the inlet channel or inlet channels and outlet channel, or outlet channels may be configured so that they bring about a substantially continuous channeling of the gas fluid within the compressor assembly. For example, the inlet channel or channels can extend from the assembly housing to the ventilator. However, the outlet channel may be designed so as not to extend over the complete flow path from electric motor to a housing opening. Instead, free flow of the gas fluid should be allowed at least in certain regions, so that the fluid can additionally flow around other components of the compressor assembly, for example, the compressor element itself.

BRIEF DESCRIPTION OF THE DRAWINGS

The drawings appended hereto are intended to illustrate contemplated embodiments of the invention. The drawings are not intended to limit the invention solely to the embodiments illustrated and described.

FIG. 2 illustrates a sectional view of the ventilator along the line II-II in FIG. 3, FIG. 3 shows an embodiment of the ventilator according to the invention in plan view, FIG. 4 illustrates a perspective view of the ventilator shown in FIG. 2, FIG. 5 illustrates a perspective sectional view of the ventilator shown in FIG. 2.

DETAILED DESCRIPTION OF THE INVENTION

Figure 7:
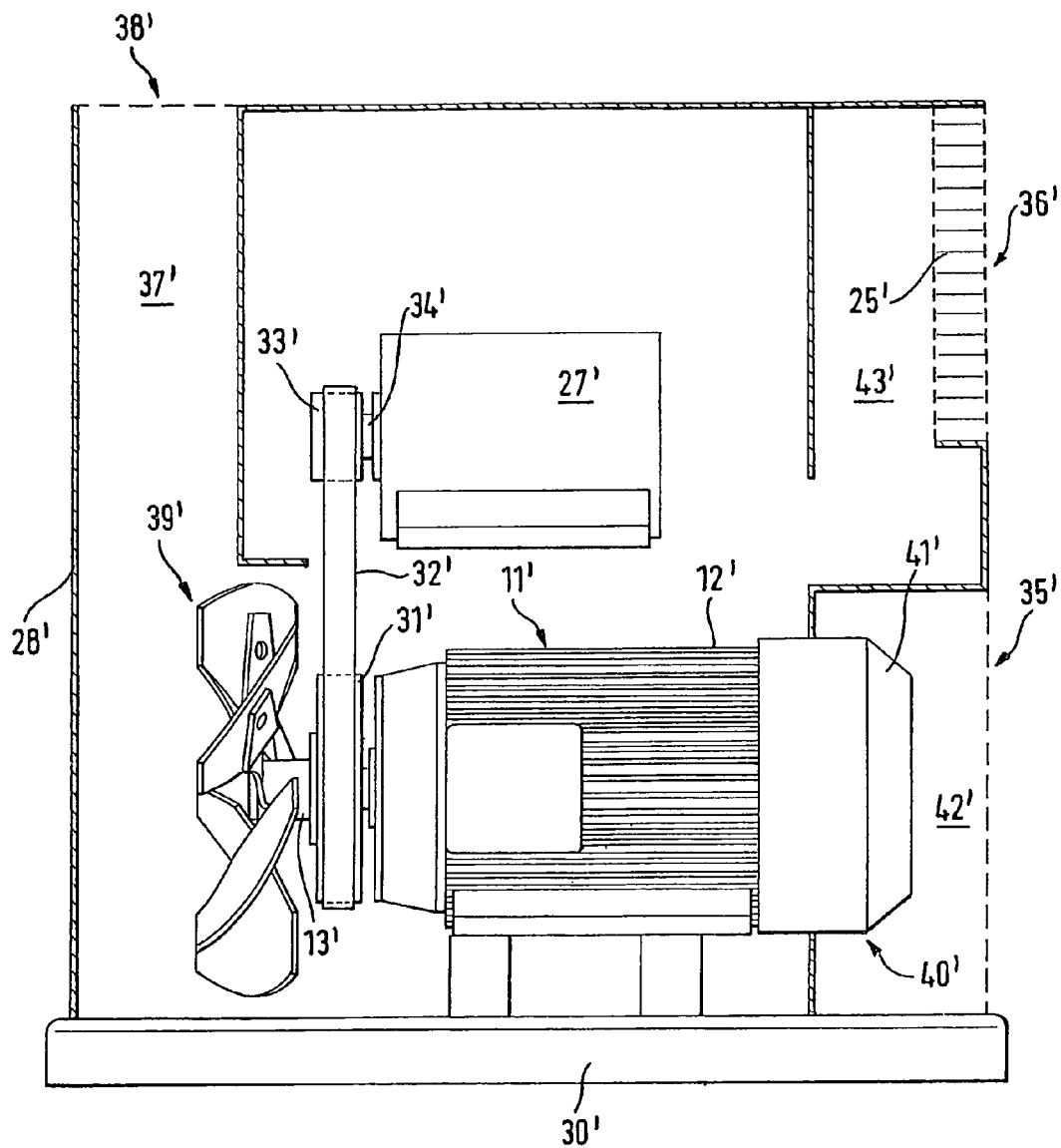
FIG. 7 shows a first embodiment of a compressor assembly according to the state of the art.

In FIG. 7, a conventional compressor assembly is illustrated schematically in partial section. Within an assembly housing 28', a motor unit 11' is mounted on a base frame 30' and includes a motor housing 12' that is to be cooled. The motor unit 11' further includes a drive shaft 13' on which is disposed, in a rotationally stable manner, a belt pulley 31' with which, by way of a belt 32', to drive a compressor element 27' that is likewise provided with a shaft 34' equipped with a belt pulley 33'. On the side of the motor unit 11' opposite the belt pulley 31', a motor ventilator unit is set onto the end face of the motor unit 11'. This motor ventilator unit 40' includes a motor ventilator cowl 41' and a motor ventilator (not shown) disposed thereunder and seated on the drive shaft 13'.

At the opposite end of the drive shaft 13', i.e. on the side where the belt pulley 31' is located (A-side of the motor unit), an assembly ventilator 39' is also disposed. The motor ventilator unit 40', below the motor ventilator cowl 41', may suck cold ambient air in through the first housing opening 35' and an adjacent first inlet channel 42' and guide it to the motor housing 12', which is to be cooled. The assembly ventilator 39' pushes outward, from the interior of the compressor assembly through an outlet channel 37', an airstream including the airstream for motor cooling in addition to an airstream for cooling the assembly. The latter airstream may enter through a second opening 36' in the assembly housing, being guided through a heat exchanger 25' integrated into the second housing opening 36' and may pass through a second inlet channel 43' into the interior of the compressor assembly. The two airstreams are then conducted together through the outlet channel 37' and expelled at a third housing opening 38'.

The dimensions of the cross sections of the first inlet channel 42', the second inlet channel 43' and the outlet channel 37', as well as the dimensions of the assembly ventilator 39' and the motor ventilator unit 40', are such as to ensure that on one hand the required stream of cooling air flows over the heat exchanger 25', while on the other hand the motor unit is cooled with separate, cool ambient air from outside. So that the cooling air for both motor and assembly can be conducted in this way, the housing 28' of the compressor assembly should be substantially closed—except for the openings of the abovementioned channels.

When the compressor element is flange-mounted on the motor unit, as is customary e.g. when it is driven either directly by way of a coupling or by a gear train, no free end of the drive shaft 13' is available on the A-side of the motor unit for installation of the assembly ventilator 39'. In this case, the shaft 34' of the compressor element 27' may be arranged so that it extends out of the compressor element 27' on its side facing away from the motor unit 11' and may be used for installing the assembly ventilator 39'. However, this solution is complicated because it demands that the shaft be guided through the compressor element in a pressure-proof and tightly sealed manner (e.g., shaft sealing ring, floating-ring seal).

In the solution shown in FIG. 7, the cooling air for the assembly flows into the heat exchanger 25' without being previously warmed; i.e., it is at the same temperature as the surroundings. Experience has shown that contamination of the heat exchanger 25' occurs predominantly on the inflow side, where the cooling air for the assembly enters the heat exchanger 25'. The circumstance that the cooling air for the assembly flows through the heat exchanger 25' installed in an outer surface of the assembly housing 28', i.e. from "outside to inside", therefore makes it easier to detect contaminants introduced by the cooling air and increases the likelihood that they will be removed before the assembly cooling deteriorates because contamination of the heat exchanger 25' has restricted the operation of the compressor. The motor ventilator unit 40', as previously mentioned, sucks in cooling air that is at the same temperature as the surroundings, through the first inlet channel 42'.

A disadvantage of this known solution is that the assembly ventilator 39' should expel into the surroundings environment not only the assembly-cooling air, but also the motor-cooling air, as a combined airstream from the interior of the compressor assembly. An assembly ventilator 39' designed for this purpose has, e.g., a larger diameter and hence the disadvantage of greater noise emission.

On account of such noise, the cooling air for screw-type compressors is often guided in such a way that the first inlet channel 42', second inlet channel 43' and outlet channel 37' are as long and narrow as possible and are lined with sound-absorbing materials, in order to reduce noise emissions from the interior of the compressor assembly into the surroundings. The long and narrow construction of the abovementioned channels, desired for acoustic reasons, is inconsistent with the likewise desirable compact structure of the assembly and furthermore is restricted by the allowable differential pressures of the airstreams in the channels, which are limited by the propulsion characteristic of the ventilators.

Another disadvantage of the embodiment shown in FIG. 7 is that in order to limit the axial dimension of the compressor assembly and nevertheless achieve a sufficiently long and effective outlet channel 37', the cooling airstream propelled by the assembly ventilator should, e.g., be diverted upwards. At the outflow side of the assembly ventilator 39' the propelled air already has a relatively high momentum, so that the outflow occurs with a high directionality. This makes diversion more difficult, because to avoid disadvantageous, high pressure losses, there should be relatively large channel cross sections and distances between the assembly ventilator 39' and the inflection point of the outlet channel 37' and/or the assembly housing 28'.

The airstream could also be diverted by using a radial fan as assembly ventilator 39', as its outflow is already substantially in the radial and circumferential direction. However, radial fans are typically more expensive than axial fans because their construction is more elaborate. Furthermore, use of a radial fan would make it more difficult to exchange the belt 32', which when an axial fan is used can be "threaded down" from the ventilator with no problems.

Figure 1:
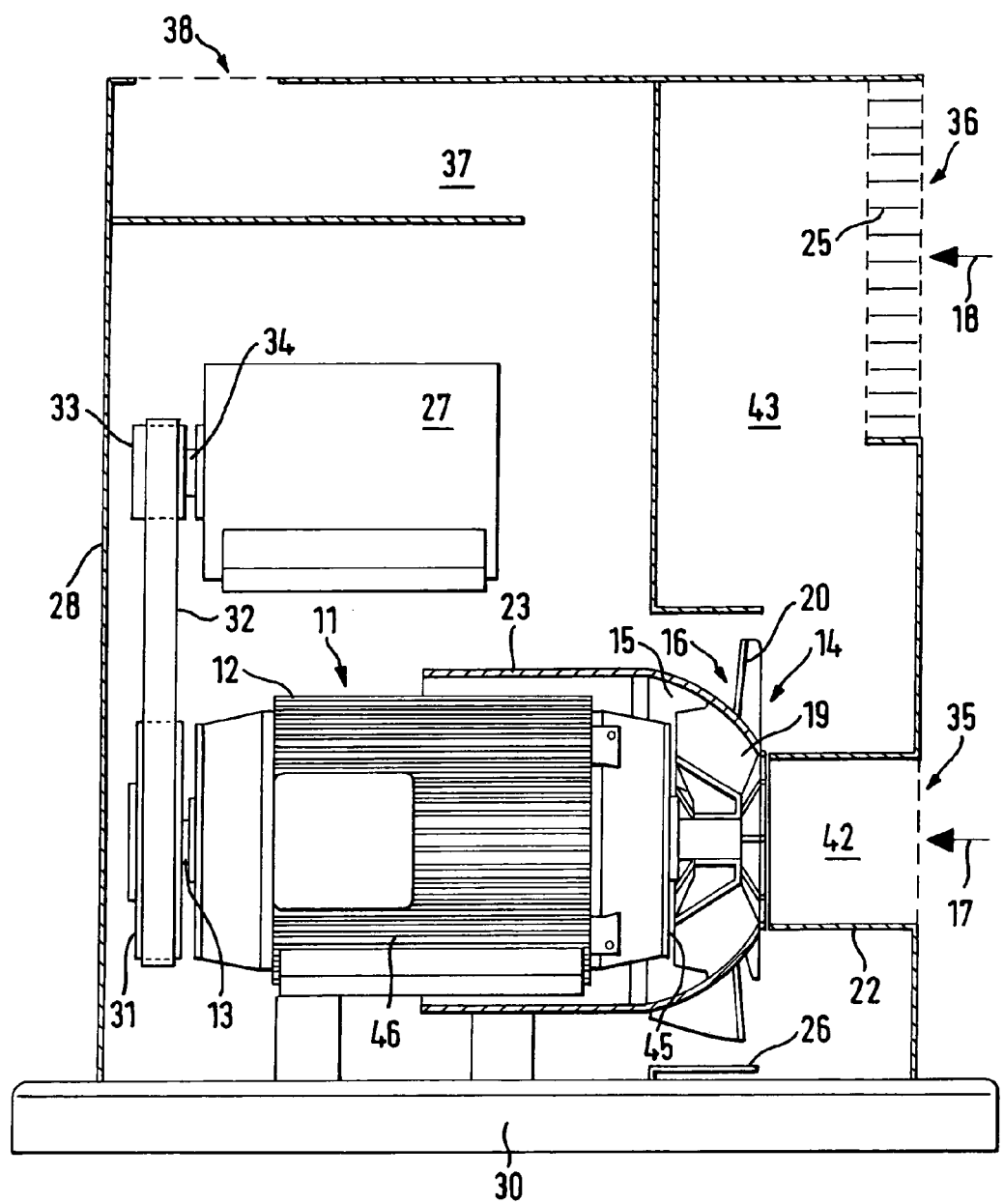
FIG. 1 illustrates a diagrammatic sectional view to explain one embodiment of a compressor assembly with the air-cooled electric motor according to the invention.

FIG. 1 shows a schematic sectional view of a compressor assembly according to one embodiment of the invention, and/or a compressor assembly incorporating an air-cooled electric motor according to the invention. The compressor assembly may include a motor unit 11 that is mounted on a base frame 30 and includes a motor housing 12 to be cooled. The motor unit 11 further incorporates a drive shaft 13 that extends through the motor unit 11 and emerges from the motor unit 11 on both sides. At a first side (A-side) of the motor housing 12 a motor-side belt pulley 31 is flange-mounted on the drive shaft 13, in a rotationally stable manner. The belt pulley 31 together with a belt 32 is used to drive a belt pulley 33 on the power take-off side, which is connected to a shaft 34 of a compressor element 27 in a rotationally stable manner.

At the opposite side of the motor housing 12, there is disposed on the drive shaft 13 a ventilator 14 constructed in accordance with the invention, which includes two ventilator sections, namely an inner ventilator section 15 and an outer ventilator section 16. According to one embodiment of the invention, the ventilator 14 may drive at least one first airstream 17, here a motor-cooling airstream, as well as a second airstream 18, here conducted so as to act as an assembly-cooling airstream. A channel separator 22 on the inflow side separates a first inlet channel 42, for the first airstream 17, from a second inlet channel 43 for the second airstream 18. By way of a first opening 35 in the assembly housing, motor-cooling air is sucked in through the first inlet channel 42 by the inner ventilator section 15 of the ventilator 14, which includes a radial fan 19. This airstream may be conducted through the inner ventilator section 15 to the motor housing 12, in particular also over an end face 45 of the motor and along cooling ribs 46 of the motor unit, so that after emerging from the inner ventilator section 15, the airstream moves substantially parallel to the drive shaft 13 of the motor unit 11.

In order to additionally improve conduction along the motor housing 12, it is advantageous to provide at the outflow side a channel separator 23 in the form of a tube that fixedly (i.e., it does not rotate along with the ventilator 14) encloses the motor housing 12 at least over a certain part of its length, preferably over at least 40% of the length of the basic structure of the motor. This channel separator 23 located on the outflow side, is configured so that it prevents, at least to a substantial extent, mixing of the motor-cooling airstream with an external environment of the outflow-side channel separator 23.

In accordance with the invention, the ventilator 14—as previously mentioned—also propels a second airstream 18, namely by way of an outer ventilator section 16. This second airstream 18 enters the interior of the compressor assembly by way of a heat exchanger 25 installed in a second opening 36 in the assembly housing. As a result, the heat exchanger 25 is cooled and simultaneously the intake side of the heat exchanger 25 is visible from the exterior, or at least remains easily accessible from the exterior. By way of a second inlet channel 43, this second airstream, which here serves as assembly-cooling air, ultimately arrives at the ventilator 14. The outer ventilator section 16, which here is constructed as an axial fan, propels the airstream likewise in a direction substantially parallel to the drive shaft 13 of the motor unit 11, so that both the first airstream 17 and the second airstream 18 are oriented in substantially the same direction, both when entering and when emerging from the ventilator. A stationary, rotationally symmetric tube 26 is disposed in such a way that it encloses the outer ventilator section 16, which constitutes an axial fan 20.

The second inlet channel 43, which is adjacent to the heat exchanger 25 and conducts the second airstream 18 (assembly-cooling airstream) in one embodiment, is oriented substantially orthogonal to the drive shaft 13 of the motor unit 11, which favors a compact construction. It is likewise advantageous in one embodiment that the deflection of the second airstream 18 that directs it towards the ventilator 14 can occur at a relatively small distance from the assembly housing 28, so that in general relatively little space in the axial direction is needed on the intake side of the outer ventilator section 16. At the outflow side of the ventilator 14 the second airstream 18 is guided through the interior of the compressor assembly, where it becomes mixed with the first airstream 17, into an outlet channel 37 from which it is expelled through a third housing opening 38. The third housing opening 38 can be disposed, for instance, on an upper side of the assembly housing 28, opposite the base frame 30. In this case the predominant direction of the outlet channel 37 can be parallel to the drive shaft 13 of the motor unit 11. The first inlet channel 42, the second inlet channel 43 and also the outlet channel 37 are preferably lined with sound-absorbing material and are geometrically configured so that they induce a high degree of acoustic damping and keep the emission of noises from the interior of the compressor assembly into the surroundings as low as possible. The pressure difference provided for propulsion of the first airstream 17 and the second airstream 18 is created by the ventilator 14, acting through the inner ventilator section 15 and outer ventilator 16, respectively.

The heat exchanger 25 in the above-described arrangement may be disposed substantially above the ventilator 14.

FIGS. 2 to 5 illustrate one embodiment of the ventilator. The sectional view in FIG. 2 illustrates the subdivision of the ventilator into the inner section 15 and the outer section 16. The airstreams 17, 18 passing through the ventilator are separated from one another by a separating surface 21, which is constructed as a rotationally symmetric surface and expands from the inflow side towards the outflow side, in particular with continuously decreasing slope. A conical surface 24 is provided in the ventilator so as to be concentric with the rotationally symmetric separating surface 21, so that the first airstream 17 is guided between the outside of the conical surface 24 and the inside of the separating surface 21. The outside of the conical surface is also oriented such that its diameter increases from the inflow side to the outflow side. Between the conical surface 24 and the separating surface 21, there are multiple first fan blades 47 (nine fan blades are provided in the illustrated embodiment) that send air in a radial direction. However, because of the shape of the separating surface 21 and an exit section 48 integrally formed therewith, this first airstream 17, although propelled by the radial fan, can emerge in a direction substantially parallel to the axis of the ventilator 14.

To facilitate attachment to the drive shaft 13, the ventilator 14 may includes an axial aperture 49, which can be provided as an opening in an otherwise massive cone. However, what is preferred is an axial aperture 49 formed by a substantially cylindrical basic body 50 that is connected, by way of a plurality of ribs 51, to a conical surface 24 that forms a cone.

The outer ventilator section 16, which preferably acts as an axial fan, is formed by providing second fan blades 52 on the outside of the separating surface 21 (six fan blades are provided in the illustrated embodiment).

Figure 6:
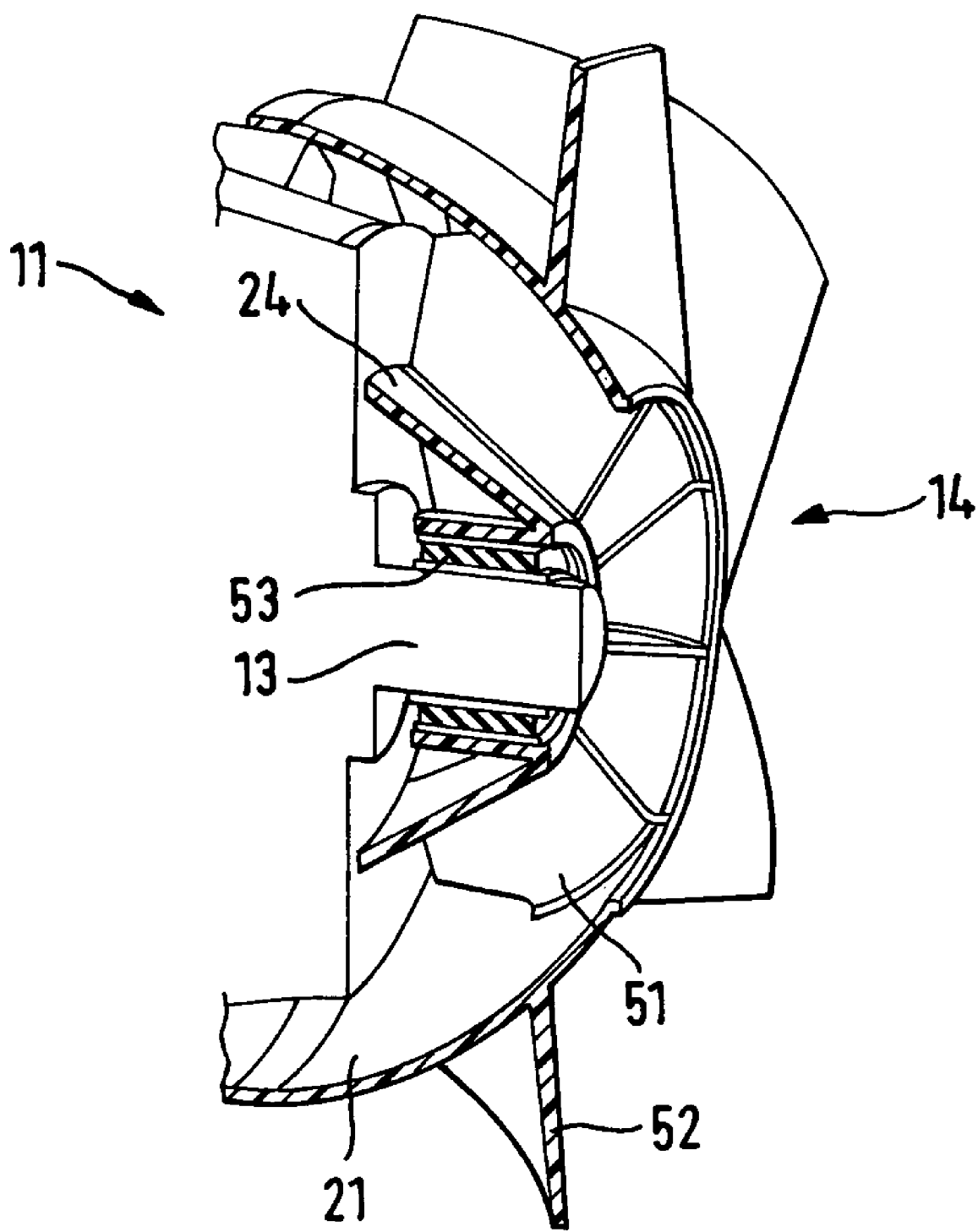
FIG. 6 illustrates a perspective sectional view of the ventilator shown in FIG. 2, which here is connected to a drive shaft of the electric motor by way of a torsional vibration damper.

In FIG. 6, a perspective sectional view of the ventilator 14 that is mounted on the drive shaft 13 is shown. To avoid torque impulses, which could be transferred from the drive shaft 13 to the ventilator 14, there is disposed on the drive shaft 13 a torsional vibration damper 53 in the form of a metal-rubber sheath on which the ventilator 14 is seated.

The ventilator in accordance with the invention may be constructed as a plastic injection-moulded part and, as such, is economical in comparison to the sum of the individual costs for production of a conventional motor ventilator, a conventional motor-ventilator cowl and a conventional assembly ventilator.

The dimensions of the compressor assembly can be reduced in comparison to known solutions, while still meeting otherwise similar requirements regarding the amounts and differential pressures of the cooling air, as well as the acoustic damping structure for the cooling-air channels. In contrast to the solution shown in FIG. 7, for instance, this is made possible by the fact that the vertical channel 37' for discharged air is eliminated and is replaced by the shorter outlet channel 37, which may be oriented parallel to the drive shaft 13 of the motor unit 11. Because the ventilator 14 is installed on the B-side of the motor unit and sends air towards the motor housing 12, there is enough room in the compressor assembly, with no extra enlargement of its dimensions, for the assembly-cooling air to be diverted towards the outlet channel 37. Because the outer ventilator section 16 sucks air in at its inflow side without markedly affecting the direction of flow, the second airstream 18 (the cooling air for the assembly) may be guided through a relatively narrow (i.e., short, in the direction of the drive shaft), but broad, second inlet channel 43, with acceptable pressure losses.

In contrast to the assembly ventilator 39' in FIG. 7, the outer ventilator section 16 propels only the stream of cooling air that comes through the heat exchanger 25, and not an additional motor-cooling airstream as is the case in the conventional arrangement shown in FIG. 7. As a result, the outer ventilator section 16 can have smaller dimensions that, among other things, reduces the noise emitted from the ventilator 14.

While the preferred forms of the invention have been disclosed, it will be apparent to those skilled in the art that various changes and modifications may be made that will achieve some of the advantages of the invention without departing from the spirit and scope of the invention. It will be apparent to those reasonably skilled in the art that other components performing the same function may be suitably substituted. Therefore, the scope of the invention is to be determined solely by the appended claims.

We claim:

1. A compressor assembly that provides a compressed gas fluid, the compressor assembly comprises:
   an outer assemblage housing;
   a heat exchanger disposed in the outer assemblage housing and that provides direct or indirect cooling of the compressed gas fluid;
   an air-cooled electric motor that comprises:
      a motor unit having a motor housing; and
      a drive shaft that projects through the motor housing;
   a ventilator that is coupled to the drive shaft, the ventilator having at least radially and/or axially separated ventilator sections that are configured to propel a first airstream and at least one other airstream, wherein the drive shaft drives the ventilator, wherein the at least one other airstream is separate from the first airstream, wherein the first airstream and the at least one other airstream enter corresponding ventilator sections by way of spatially separated cross sections and emerge from the corresponding ventilator sections without becoming mixed or without being substantially mixed, and
wherein at least one of the first airstream or the at least one other airstream are guided through the heat exchanger, further comprising:
   an inflow channel separator that is located at the inflow side of the ventilator through whose interior the first airstream is guided to the corresponding ventilator section, wherein the inflow channel separator is an air duct which extends between a first opening in the outer assemblage housing and the ventilator, and wherein the first airstream passes through an interior of the air duct, wherein the ventilator includes a separating surface comprising fan blades, said separating surface defining a substantially circular opening which allows air to flow into the ventilator, wherein a portion of the air duct of the inflow channel separator that is proximate to the separating surface is defined by a radius, and wherein the radius of the circular opening substantially matches the radius of the air duct of the inflow channel separator at the proximate portion of the air duct.

2. The compressor assembly according to claim 1, wherein the first airstream is guided substantially without previously being warmed.

3. The compressor assembly according to claim 1, wherein the heat exchanger is disposed upstream of the ventilator and the at least one other airstream is guided to the corresponding ventilator section by way of the heat exchanger.

4. The compressor assembly according to claim 1, wherein the first airstream and the at least one other airstream are guided separately on an outflow side of the ventilator.

5. The compressor assembly according to claim 4, wherein the first airstream and the at least one other airstream are guided, on the outflow side of the ventilator, substantially in parallel and in a same direction after leaving the corresponding ventilator sections.

6. The compressor assembly according to claim 5, wherein the first airstream and the at least one other airstream are guided, on the outflow side of the ventilator, substantially parallel to the drive shaft.

7. The compressor assembly according to claim 1, wherein the first airstream is guided to cool an outside surface of the motor housing.

8. The compressor assembly according to claim 1, wherein the ventilator sections include an inner ventilator section and an outer ventilator section, wherein the inner ventilator section includes a radial fan and the outer ventilator includes an axial fan.

9. The compressor assembly according to claim 1, wherein the separating surface comprises a rotationally symmetric separating surface that is constructed as a rotation surface and is configured to separate the first airstream and the at least one other airstream that flow inside the ventilator.

10. The compressor assembly according to claim 1, further comprising an outflow side channel separator which comprises a substantially cylindrical jacket that partially encloses the motor housing.

11. The compressor assembly according to claim 10, wherein an outflow side of the separating surface is matched to a radius of the outflow side channel separator so that the first airstream and the at least one other airstream are separated by a sufficient distance from one another.

12. The compressor assembly according to claim 1, further comprising a rotationally symmetric tube, wherein a periphery of the ventilator interacts with the rotationally symmetric tube to reduce a formation of eddies and wherein the rotationally symmetric tube is stationary or rotates along with the ventilator.

13. The compressor assembly according to claim 1, wherein the drive shaft is constructed as a single piece or as several pieces and extends out of the motor housing at two opposite sides, wherein one side of the drive shaft is constructed as a power-output shaft for coupling to a gear train or a machine tool, and wherein the opposite side of the drive shaft is configured to couple to the ventilator.

14. The compressor assembly according to claim 8, wherein the inner ventilator section comprises a conical-shaped surface and wherein the first airstream is guided between the conical surface and the separating surface.

15. The compressor assembly according to claim 1, further comprising an intermediate torsional vibration damper that is attached to the drive shaft and is positioned between the ventilator and the drive shaft.

16. The compressor assembly according to claim 1, wherein the ventilator is constructed as a plastic injection-moulded part, as an aluminum die-cast part or as an aluminum part formed by chill casting.

17. The compressor assembly according to claim 1, wherein the heat exchanger is integrated into the outer assemblage housing and wherein the heat exchanger is positioned at an inflow side of the associated airstream to be visible from outside the outer assemblage housing.

18. The compressor assembly according to claim 1, wherein the air duct of the inflow channel separator is a cylindrical tubular piece and wherein the first airstream passes through an interior of the cylindrical tubular piece.

19. The compressor assembly according to claim 1, further comprising inlet and outlet channels that are arranged to guide the compressed gas fluid into and out of the compressor assembly, wherein the inlet and outlet channels include sound-damping material to attenuate sound emission from the compressor assembly.

20. An air-cooled electric motor, comprising:
a motor unit comprising:
  a motor housing;
  a drive shaft, wherein the drive shaft extends through the motor housing;
a ventilator that is coupled to the drive shaft to enable the drive shaft to drive the ventilator, the ventilator comprising: at least two radially and/or axially separated ventilator sections that propel a first airstream and at least one other airstream, wherein the at least one other airstream is separate from the first airstream, wherein the first airstream and the at least one other airstream are conducted separately on an inflow side of the ventilator, and wherein the ventilator sections include spatially separated cross sections that guide corresponding ones of the first airstream and the at least one other airstream and enable the first airstream and the at least one other airstream to emerge from the spatially separated cross sections without becoming mixed, or without substantial mixing, further comprising:
an inflow channel separator that is located at the inflow side of the ventilator through whose interior the first airstream is guided to the corresponding ventilator section,
wherein the inflow channel separator is an air duct and the first airstream passes through an interior of the air duct,
wherein the ventilator includes a separating surface comprising fan blades, said separating surface defining a substantially circular opening which allows air to flow into the ventilator, wherein a portion of the air duct of the inflow channel separator that is proximate to the separating surface is defined by a radius, and wherein the radius of the circular opening substantially matches the radius of the air duct of the inflow channel separator at the proximate portion of the air duct.

21. The air-cooled electric motor according to claim 20, wherein the first airstream and the at least one other airstream are separately conducted on an outflow side of the ventilator.

22. The air-cooled electric motor according to claim 20, wherein the first airstream and the at least one other airstream are conducted, on the outflow side of the ventilator, substantially in parallel and in a same direction.

23. The air-cooled electric motor according to claim 20, wherein the first airstream is conducted to cool an outside surface of the motor housing.

24. The air-cooled electric motor according to claim 20, wherein the ventilator sections include an inner ventilator section and an outer ventilator section, wherein the inner ventilator section is constructed as a radial fan and wherein the outer ventilator section is constructed as an axial fan.

25. The air-cooled electric motor according to claim 20, wherein the separating surface comprises a rotationally symmetric separating surface that is constructed as a rotation surface and is configured to separate the first airstream and the at least one other airstream that flow within the ventilator.

26. The air-cooled electric motor according to claim 20, wherein the drive shaft is constructed of one piece or of several pieces and projects out of the motor housing at two opposite sides, wherein one side is constructed as a power-output shaft for coupling to a gear train or a machine tool, and wherein the opposite side of the drive shaft is configured to couple to the ventilator.

27. The air-cooled electric motor according to claim 20, further comprising an intervening torsional vibration damper that is attached to the drive shaft and is positioned between the ventilator and the drive shaft.

28. The air-cooled electric motor according to claim 20, wherein the ventilator is constructed as a plastic injection-moulded part, as an aluminum diecast part or an aluminum part formed by chill casting.

* * * * *